(12) United States Patent
Nakagawa et al.

(10) Patent No.: US 11,170,754 B2
(45) Date of Patent: Nov. 9, 2021

(54) INFORMATION PROCESSOR, INFORMATION PROCESSING METHOD, AND PROGRAM

(71) Applicant: Sony Corporation, Tokyo (JP)

(72) Inventors: Ayumi Nakagawa, Kanagawa (JP); Takanobu Omata, Kanagawa (JP); Soichiro Inatani, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/629,967

(22) PCT Filed: Apr. 23, 2018

(86) PCT No.: PCT/JP2018/016392
§ 371 (c)(1),
(2) Date: Jan. 10, 2020

(87) PCT Pub. No.: WO2019/017033
PCT Pub. Date: Jan. 24, 2019

(65) Prior Publication Data
US 2020/0160833 A1    May 21, 2020

(30) Foreign Application Priority Data
Jul. 19, 2017    (JP) .............................. JP2017-139856

(51) Int. Cl.
*G10L 13/033* (2013.01)
*G10L 13/10* (2013.01)
*G10L 25/51* (2013.01)

(52) U.S. Cl.
CPC ............ *G10L 13/033* (2013.01); *G10L 13/10* (2013.01); *G10L 25/51* (2013.01)

(58) Field of Classification Search
CPC ..................................................... G10L 15/22
See application file for complete search history.

(56) References Cited

U.S. PATENT DOCUMENTS 6,205,427 B1 *  3/2001  Itoh ...................... G09B 21/006
                                                    704/258
7,305,340 B1 * 12/2007  Rosen .................. G10L 13/033
                                                    704/258
(Continued)

FOREIGN PATENT DOCUMENTS

JP      2002-268666 A       9/2002
JP      2002268666 A  *     9/2008  ............. G10L 15/00

OTHER PUBLICATIONS

International Search Report and Written Opinion dated Jun. 26, 2018 for PCT/JP2018/016392 filed on Apr. 23, 2018, 8 pages including English Translation of the International Search Report.

*Primary Examiner* — Douglas Godbold
(74) *Attorney, Agent, or Firm* — Xsensus LLP

(57) ABSTRACT

[Problem] To allow a user to grasp clearly a source of information with sound.
[Solution] There is provided an information processor that includes an output control unit that controls output of an information notification using sound, the output control unit causing, on the basis of a recognized external sound source, the information notification to be output in an output mode that is not similar to an external sound that can be emitted by the external sound source. There is also provided an information processing method that includes controlling, by a processor, output of an information notification using sound, the controlling further including causing, on the basis of a recognized external sound source, the information notification to be output in an output mode that is not similar to an external sound that can be emitted by the external sound source.

20 Claims, 12 Drawing Sheets

(56) References Cited

U.S. PATENT DOCUMENTS

| | | | | |
|---|---|---|---|---|
| 8,326,629 | B2* | 12/2012 | Skuratovsky | G10L 13/10 704/260 |
| 10,586,079 | B2* | 3/2020 | Almudafar-Depeyrot | G10L 13/00 |
| 2001/0005825 | A1* | 6/2001 | Engelke | G10L 15/26 704/235 |
| 2003/0014253 | A1* | 1/2003 | Walsh | G10L 13/08 704/260 |
| 2003/0061049 | A1* | 3/2003 | Erten | G10L 13/08 704/260 |
| 2009/0043583 | A1* | 2/2009 | Agapi | G10L 13/04 704/260 |
| 2012/0240045 | A1* | 9/2012 | Bradley | G10L 13/04 715/716 |
| 2017/0289766 | A1* | 10/2017 | Scott | H04W 4/023 |

* cited by examiner

FIG.1
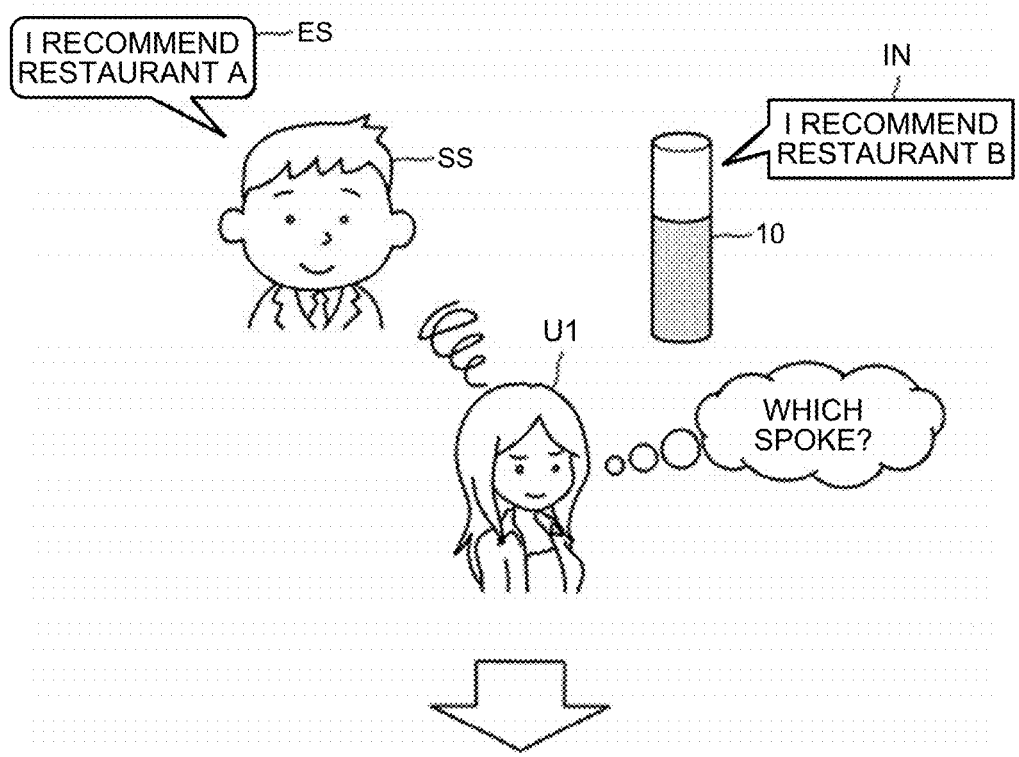
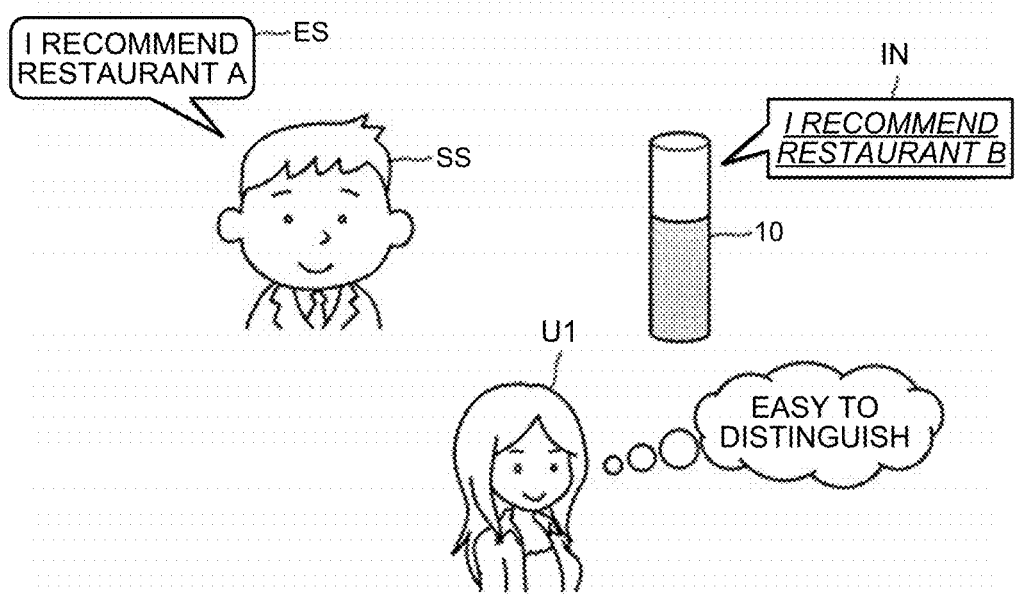
FIG.2
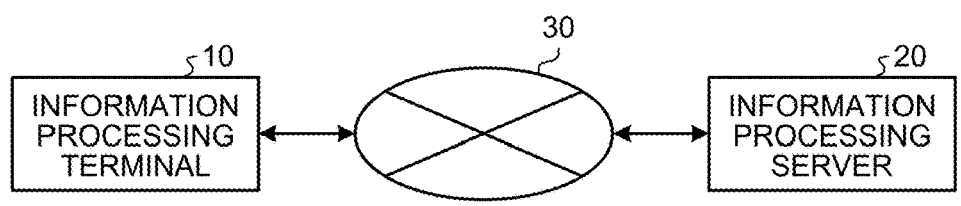

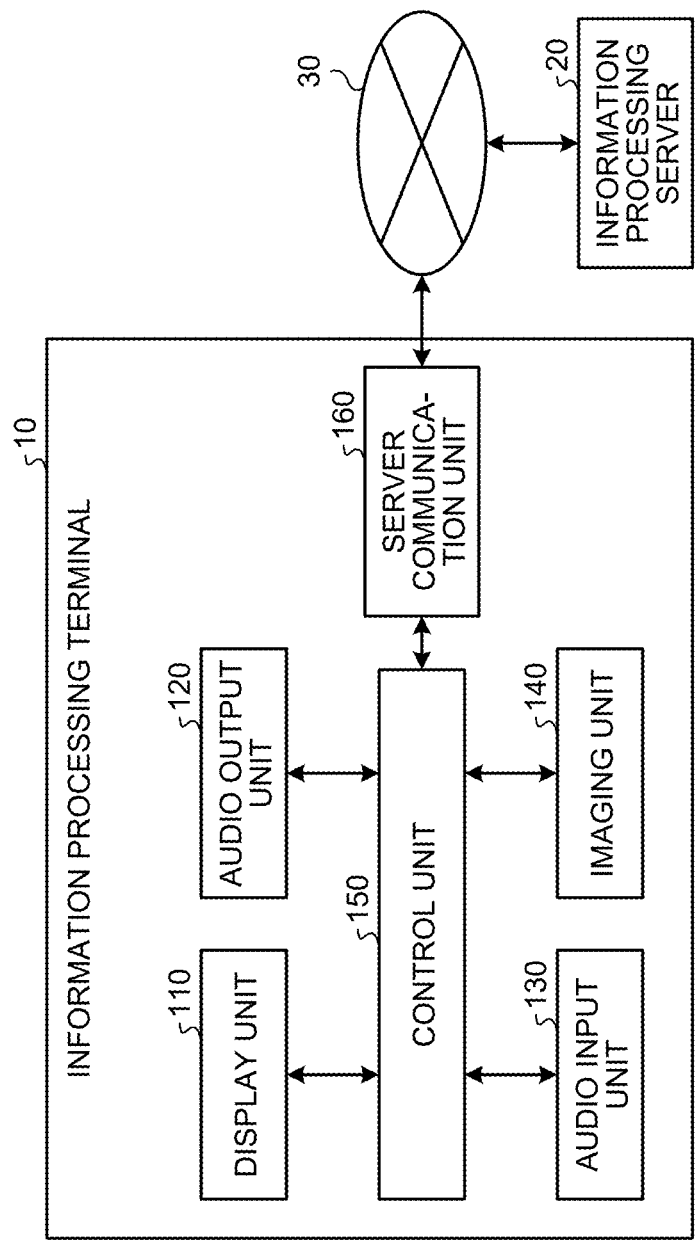

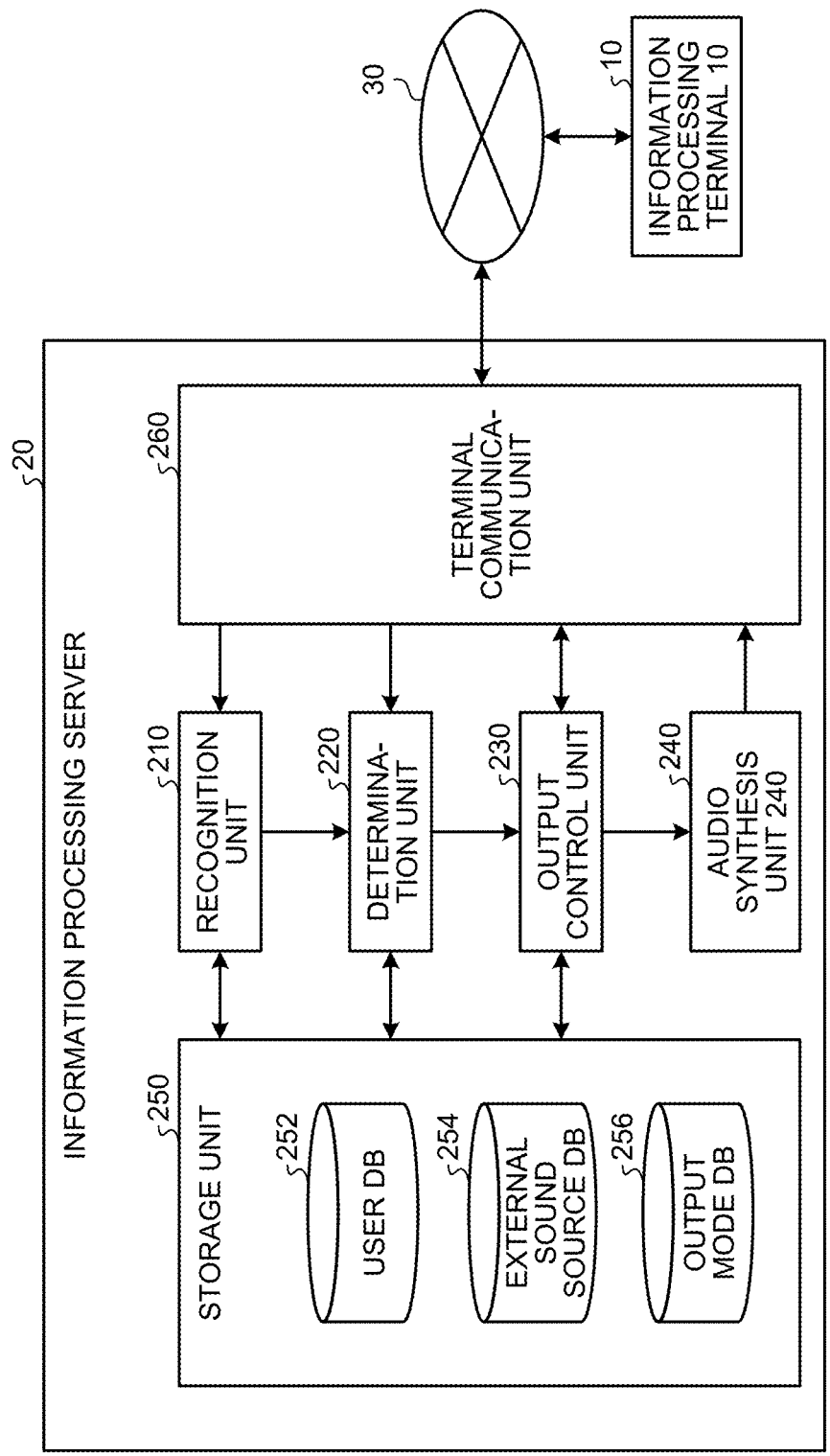

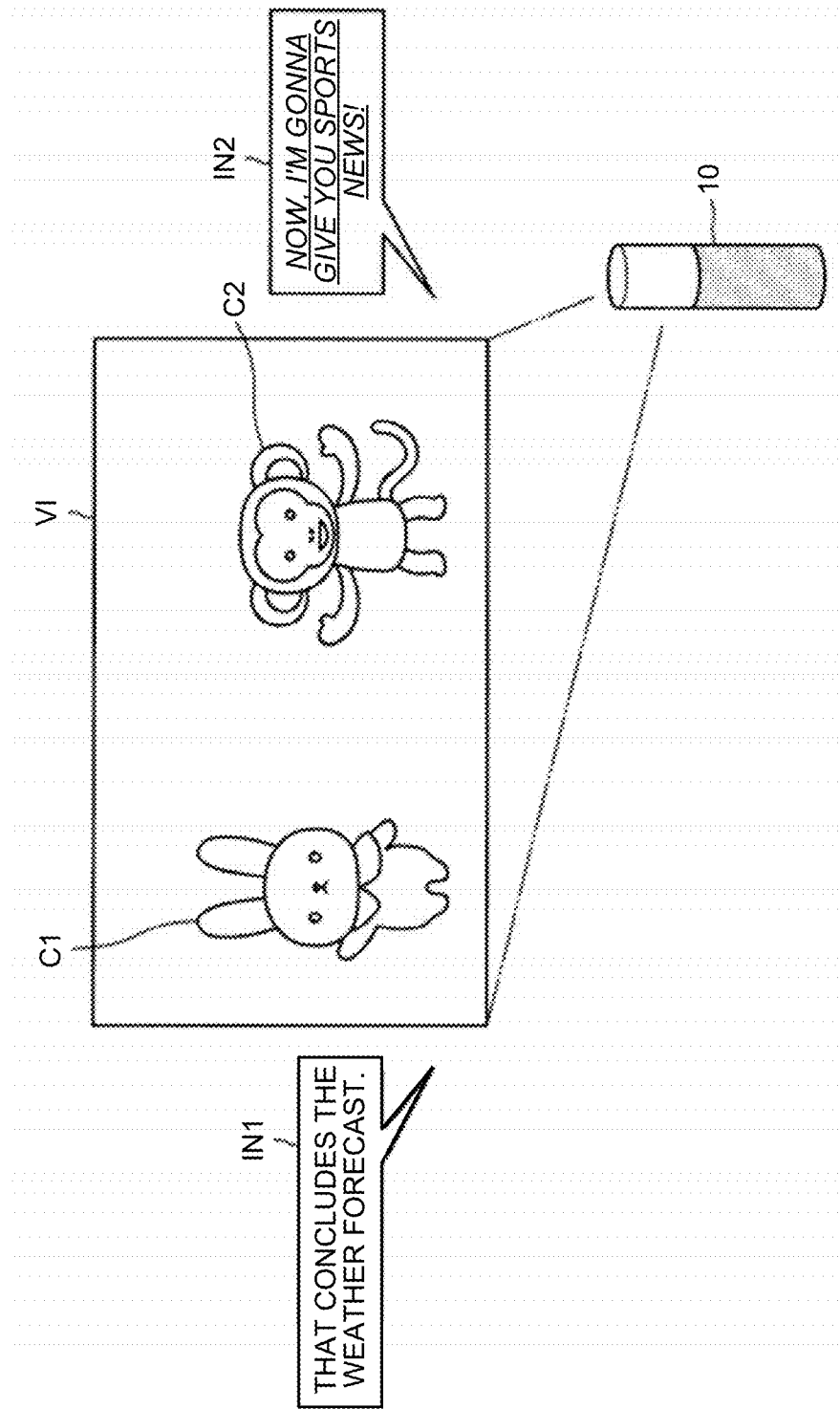

FIG.10
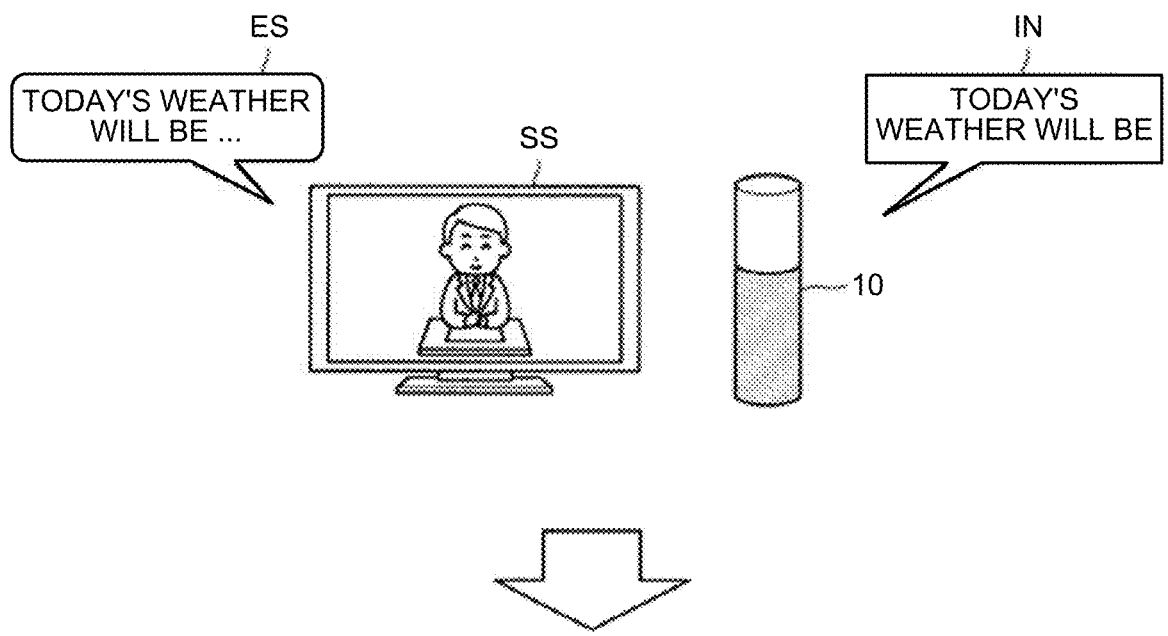
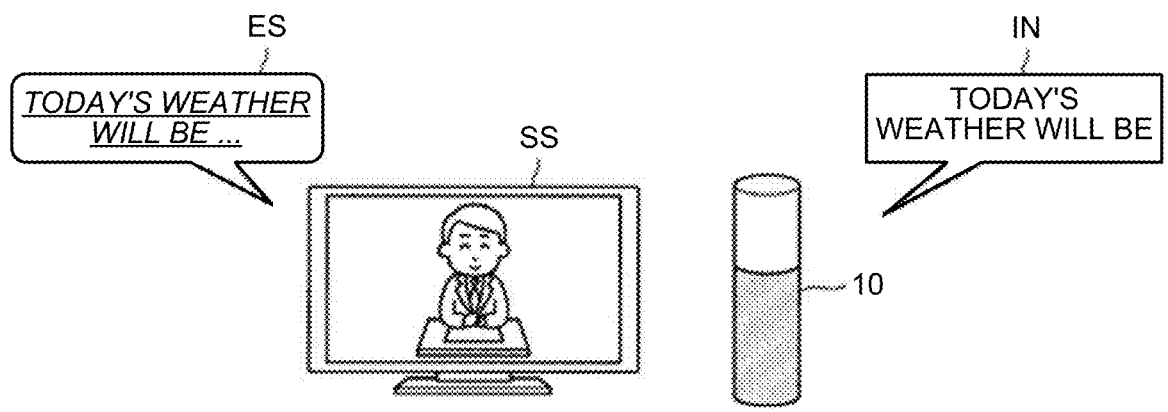

INFORMATION PROCESSOR, INFORMATION PROCESSING METHOD, AND PROGRAM

CROSS-REFERENCE TO RELATED APPLICATIONS

The present application is based on PCT filing PCT/JP2018/016392, filed Apr. 23, 2018, which claims priority to JP 2017-139856, filed Jul. 19, 2017, the entire contents of each are incorporated herein by reference.

FIELD

The present disclosure relates to an information processor, an information processing method, and a program.

BACKGROUND

In recent years, various output devices that notify users of information using sound have become widespread. Further, many technologies for enhancing user convenience related to information notifications by sound have been developed. For example, Patent Literature 1 discloses a robot that changes a voice quality at a time of utterance as a maintenance inspection date approaches.

CITATION LIST

Patent Literature

Patent Literature 1: JP 2016-90724 A

SUMMARY

Technical Problem

Meanwhile, in a case where an output device as described above is used in a situation where another sound source exists around, it is assumed that a sound output by the other sound source may be similar to a sound output by the output device. In this case, a situation may arise in which a user cannot identify a source of a perceived sound.

The present disclosure therefore proposes a new and improved information processor, information processing method, and program that allow a user to grasp clearly the source of information with sound.

Solution to Problem

According to the present disclosure, an information processor is provided that includes: an output control unit that controls output of an information notification using sound, wherein the output control unit causing, on the basis of a recognized external sound source, the information notification to be output in an output mode that is not similar to an external sound that can be emitted by the external sound source.

Moreover, according to the present disclosure, an information processing method is provided that includes: controlling, by a processor, output of an information notification using sound, wherein the controlling further including, causing, on the basis of a recognized external sound source, the information notification to be output in an output mode that is not similar to an external sound that can be emitted by the external sound source.

Moreover, according to the present disclosure, a program is provided that causes a computer to function as an information processor comprising an output control unit that controls output of an information notification using sound, the output control unit causing, on the basis of a recognized external sound source, the information notification to be output in an output mode that is not similar to an external sound that can be emitted by the external sound source.

Advantageous Effects of Invention

As described above, according to the present disclosure, it is possible to allow a user to grasp clearly a source of information with sound.

Note that the effect described above is not necessarily restrictive. Along with or instead of the effect described above, any of the effects described in the present specification or other effects that can be grasped from the present specification may be produced.

BRIEF DESCRIPTION OF DRAWINGS

FIG. 1 is a diagram for describing an overview of one embodiment of the present disclosure.

FIG. 2 is a block diagram illustrating a system configuration example of an information processing system according to the same embodiment.

FIG. 3 is a block diagram illustrating a functional configuration example of an information processing terminal according to the same embodiment.

FIG. 4 is a block diagram illustrating a functional configuration example of an information processing server according to the same embodiment.

FIG. 6 is a diagram for describing control of a timing of changing an output mode on the basis of an information notification category according to the same embodiment.

FIG. 10 is a diagram for describing control of an external sound source according to the same embodiment.

DESCRIPTION OF EMBODIMENTS

Figure 5A:
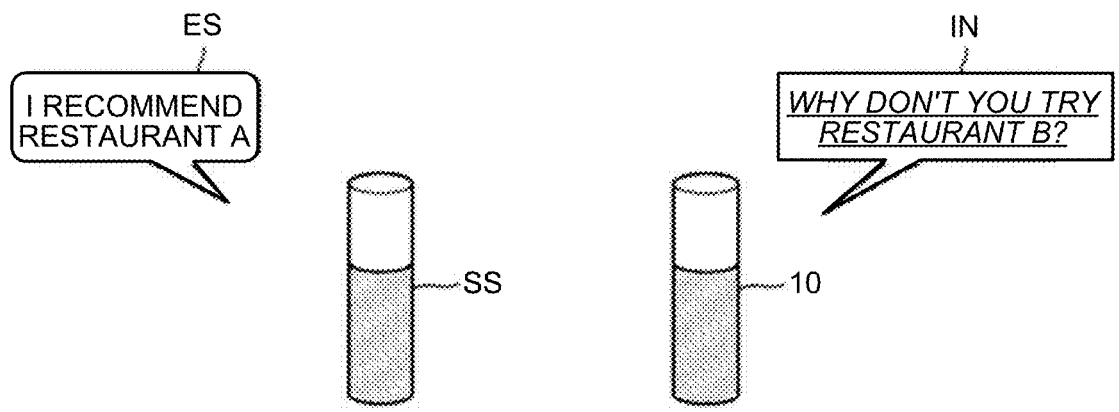
FIG. 5A is a diagram for describing a variation of an external sound source according to the same embodiment.

Preferred embodiments of the present disclosure will be described below in detail with reference to the accompanying drawings. Note that in the present specification and the drawings, components having substantially the same functional configurations will be denoted by the same reference numerals, and redundant description will be omitted.

Note that the description will be given in the following order.

1. Embodiment
1.1. Overview of embodiment
1.2. System configuration example
1.3. Functional configuration example of information processing terminal 10
1.4. Functional configuration example of information processing server 20
1.5. Details of output control
1.6. Flow of processing
2. Hardware configuration example
3. Summary

1. Embodiment

1.1. Overview of Embodiment

First, an overview of one embodiment of the present disclosure will be described. As described above, in recent years, various output devices that perform information notifications using sound have become widespread. An output device as described above has, for example, a function of using voice to answer a user's question or a function of notifying a user at a predetermined time with a notification sound such as an alarm.

By using the output device as described above, a user can easily enjoy various information without restriction on direction of gaze and behavior. For example, the user can interact with the output device to receive presentation of information related to a recipe or the like while cooking.

Thus, the output device as described above can be used in various situations. However, in a case where the output device is used in an environment in which another sound source exists, a situation may be assumed in which it is difficult to identify a source of a sound.

For example, in a case where similar sounds are output at the same time from the output device and the other sound source, it is difficult for a user to identify whether a source of a sound the user has perceived is the output device or the other sound source. Further, even in a case where sounds are not output at the same time, in a case where the user is aware that the output device and the other sound source output similar sounds, the user may fail to identify a source of a sound the user has perceived.

The technical idea according to the present disclosure has been conceived by paying attention to the points described above, and allows a user to grasp clearly a source of information with sound. For this purpose, one of features of an information processor, an information processing method, and a program according to the embodiment of the present disclosure is to cause, on the basis of a recognized external sound source, an output device to output an information notification in an output mode that is not similar to a sound that can be emitted by the external sound source.

FIG. 1 is a diagram for describing an overview of the embodiment of the present disclosure. FIG. 1 illustrates an information processing terminal 10 that performs an information notification using sound, a user U1 who receives the information notification by the information processing terminal 10, and an external sound source SS that corresponds to the other sound source described above.

Further, FIG. 1 illustrates an information notification IN output by the information processing terminal 10 and an external sound ES emitted by the external sound source SS. Note that in the drawings in the present disclosure, text decorations for the information notification IN and the external sound ES indicate similarity in acoustic features. That is, in a case where the information notification IN and the external sound ES are represented by the same text decoration, it indicates that the information notification IN and the external sound ES have similar acoustic features. On the other hand, in a case where the information notification IN and the external sound ES are represented by different text decorations, it indicates that the information notification IN and the external sound ES have dissimilar acoustic features.

Further, the external sound source SS according to the present embodiment may be a sound source that can emit a sound that rivals an information notification emitted by the information processing terminal 10. In a case of an example illustrated in FIG. 1, the information processing terminal 10 is a device that uses artificial voice to notify the user U1 of information, and thus the external sound source SS is illustrated as a person different from the user U1.

Here, as illustrated in an upper part of FIG. 1, in a case where the information notification IN output by the information processing terminal 10 and the external sound ES uttered by the external sound source SS have similar acoustic features, a situation may arise in which the user U1 has difficulty in judging whether a sound the user U1 has perceived is the information notification IN output by the information processing terminal 10 or the external sound ES uttered by the external sound source SS. It is assumed that a situation as described above is particularly likely to arise when the user U1 is performing another action or looking away from the information processing terminal 10 or the external sound source SS.

For this reason, in a case where an output mode preset in the information processing terminal 10 and the external sound ES that can be emitted by the external sound source SS have similar acoustic features, an information processing server 20 according to the embodiment of the present disclosure can cause the information processing terminal 10 to output the information notification IN in an output mode that is not similar to the external sound ES. More specifically, in a case where similarity between the external sound ES and the output mode preset for the information notification IN exceeds a threshold, the information processing server 20 may cause the information processing terminal 10 to output the information notification IN in an output mode that is not similar to the external sound ES.

A lower part of FIG. 1 illustrates the information notification IN in an output mode controlled by the information processing server 20 according to the present embodiment. Here, in comparing the information notification IN and the external sound ES in the lower part of FIG. 1, it can be seen that the information notification IN is represented by a text decoration different from that of the external sound ES. As described above, in the drawings in the present disclosure, text decorations indicate similarity in acoustic features. That is, the lower part of FIG. 1 illustrates that the information processing server 20 controls the information processing terminal 10 to output the information notification IN in an output mode that is not similar to the external sound ES.

According to the above-described function of the information processing server 20 according to the present embodiment, the user U1 can clearly and distinctly perceive the information notification IN output by the information processing terminal 10 and the external sound ES emitted by the external sound source SS, and can correctly receive information sent from each of the information processing terminal 10 and the external sound source SS. The above-described function of the information processing server 20 according to the present embodiment will be described below in detail.

1.2. System Configuration Example

Next, a system configuration example of an information processing system according to the embodiment of the present disclosure will be described. FIG. 2 is a block diagram illustrating the system configuration example of the information processing system according to the present embodiment. Referring to FIG. 2, the information processing system according to the present embodiment includes the information processing terminal 10 and the information processing server 20. Further, the information processing terminal 10 and the information processing server 20 are connected via the network 30 so that they can communicate with each other.

(Information Processing Terminal 10)

The information processing terminal 10 according to the present embodiment is a device that notifies a user of information using sound on the basis of control by the information processing server 20. Note that the information processing terminal 10 according to the present embodiment may perform an information notification using a notification sound such as an alarm, or may perform a voice notification using artificial voice.

The information processing terminal 10 according to the present embodiment can be achieved as various devices having an acoustic output function. The information processing terminal 10 according to the present embodiment may be, for example, a mobile phone, a smartphone, a tablet, a wearable device, a computer, or a dedicated device of stationary type or autonomous mobile type.

(Information Processing Server 20)

The information processing server 20 according to the present embodiment is an information processor that controls output of an information notification by the information processing terminal 10. As described above, the information notification described above includes various notifications using a notification sound, artificial voice, or the like. At this time, the information processing server 20 according to the present embodiment has a function of controlling an output mode of an information notification output by the information processing terminal 10 on the basis of a recognized external sound source. Specifically, the information processing server 20 according to the present embodiment can cause the information processing terminal 10 to output an information notification in an output mode that is not similar to an external sound that can be emitted by the external sound source.

(Network 30)

The network 30 has a function of connecting the information processing terminal 10 and the information processing server 20. The network 30 may include a public line network such as the Internet, a telephone line network, or a satellite communication network, various local area networks (LANs) including Ethernet (registered trademark), or a wide area network (WAN). Further, the network 30 may include a dedicated line network such as an Internet protocol-virtual private network (IP-VPN). Further, the network 30 may include a wireless communication network such as Wi-Fi (registered trademark) or Bluetooth (registered trademark).

The system configuration example of the information processing system according to the present embodiment has been described above. Note that the configuration described above with reference to FIG. 2 is merely an example, and the configuration of the information processing system according to the present embodiment is not limited to such an example. For example, the functions of the information processing terminal 10 and the information processing server 20 according to the present embodiment may be implemented by a single device. The configuration of the information processing system according to the present embodiment can be flexibly modified depending on specifications and operations.

1.3. Functional Configuration Example of Information Processing Terminal 10

Next, a functional configuration example of the information processing terminal 10 according to the present embodiment will be described. FIG. 3 is a block diagram illustrating the functional configuration example of the information processing terminal 10 according to the present embodiment. Referring to FIG. 3, the information processing terminal 10 according to the present embodiment includes a display unit 110, an audio output unit 120, an audio input unit 130, an imaging unit 140, a control unit 150, and a server communication unit 160.

(Display Unit 110)

The display unit 110 according to the present embodiment has a function of outputting visual information such as images and text. The display unit 110 according to the present embodiment can display visual information associated with an information notification by sound on the basis of control by the information processing server 20, for example.

For this purpose, the display unit 110 according to the present embodiment includes a display device that presents visual information. Examples of the display device described above include a liquid crystal display (LCD) device, an organic light emitting diode (OLED) device, and a touch panel. Further, the display unit 110 according to the present embodiment may use a projection function to output visual information.

(Audio Output Unit 120)

The audio output unit 120 according to the present embodiment has a function of outputting an information notification using a notification sound, artificial voice, or the like. On the basis of control by the information processing server 20, the audio output unit 120 according to the present embodiment can use voice utterance to output an answer to a user's question, for example. Further, on the basis of a preset user schedule, the audio output unit 120 may output a notification sound or the like at a timing on the basis of the schedule. For this purpose, the audio output unit 120 according to the present embodiment includes an audio output device such as a speaker or an amplifier.

(Audio Input Unit 130)

The audio input unit 130 according to the present embodiment has a function of collecting sound information such as an utterance by a user and an external sound emitted by an external sound source. The sound information collected by the audio input unit 130 is used for voice recognition and recognition of the external sound source by the information processing server 20. The audio input unit 130 according to the present embodiment includes a microphone for collecting the sound information.

(Imaging Unit 140)

The imaging unit 140 according to the present embodiment has a function of capturing images including a user and an external sound source. The images captured by the imaging unit 140 are used for user recognition and recognition of the external sound source by the information processing server 20. The imaging unit 140 according to the present embodiment includes an imaging device that can capture images. Note that the images described above include moving images in addition to still images.

(Control Unit 150)

The control unit 150 according to the present embodiment has a function of controlling each component included in the information processing terminal 10. For example, the control unit 150 controls starting and stopping of each component. Further, the control unit 150 can input a control signal generated by the information processing server 20 to the display unit 110 or the audio output unit 120. Further, the control unit 150 according to the present embodiment may have a function equivalent to that of an output control unit 230 of the information processing server 20 described later.

(Server Communication Unit 160)

The server communication unit 160 according to the present embodiment has a function of performing information communication with the information processing server 20 via the network 30. Specifically, the server communication unit 160 transmits, to the information processing server 20, sound information collected by the audio input unit 130 and image information captured by the imaging unit 140. Further, the server communication unit 160 receives, from the information processing server 20, a control signal or artificial voice related to output of an information notification.

The functional configuration example of the information processing terminal 10 according to the present embodiment has been described above. Note that the configuration described above with reference to FIG. 3 is merely an example, and the functional configuration of the information processing terminal 10 according to the present embodiment is not limited to such an example. For example, the information processing terminal 10 according to the present embodiment does not necessarily include all of the components illustrated in FIG. 3 The information processing terminal 10 may have a configuration that does not include the display unit 110 or the like. Further, as described above, the control unit 150 according to the present embodiment may have a function equivalent to that of the output control unit 230 of the information processing server 20. The functional configuration of the information processing terminal 10 according to the present embodiment can be flexibly modified depending on specifications and operations.

1.4. Functional Configuration Example of Information Processing Server 20

Next, a functional configuration example of the information processing server 20 according to the present embodiment will be described. FIG. 4 is a block diagram illustrating the functional configuration example of the information processing server 20 according to the present embodiment. Referring to FIG. 4, the information processing server 20 according to the present embodiment includes a recognition unit 210, a determination unit 220, the output control unit 230, an audio synthesis unit 240, a storage unit 250, and a terminal communication unit 260. Further, the storage unit 250 includes a user DB 252, an external sound source DB 254, and an output mode DB 256.

(Recognition Unit 210)

The recognition unit 210 according to the present embodiment has a function of recognizing a user and an external sound source. For example, the recognition unit 210 can recognize the user by comparing an utterance and image of the user collected by the information processing terminal 10 with acoustic features and image of the user stored in the user DB 252 in advance. Further, the recognition unit 210 can recognize a direction of gaze, facial expression, state, action, and the like of the user on the basis of voice and image of the user.

Further, the recognition unit 210 can recognize the external sound source by comparing sound information and image collected by the information processing terminal 10 with acoustic features and structural features of the external sound source stored in the external sound source DB 254. Note that the recognition unit 210 can also recognize the external sound source by receiving identification information from the external sound source via the network 30.

Further, in a case where data that corresponds to the collected sound information and image is not recorded on the external sound source DB 254, the recognition unit 210 causes data related to a new external sound source to be recorded on the external sound source DB 254 on the basis of the sound information and image described above.

Further, the recognition unit 210 performs voice recognition based on the user's utterance collected by the information processing terminal 10.

(Determination Unit 220)

The determination unit 220 according to the present embodiment has a function of determining similarity between an external sound that can be emitted by an external sound source and an output mode preset for an information notification. The determination unit 220 may determine the similarity described above on the basis of, for example, acoustic features such as a frequency, prosody, output intensity, and voice quality (speaker model) of the external sound and those of the information notification. Note that the prosody described above includes a rhythm, strength, length, and the like of sound.

On the basis of recognition of the external sound source by the recognition unit 210, the determination unit 220 may perform the determination described above by acquiring, from the external sound source DB 254, acoustic features of an external sound that can be emitted by the external sound source. Further, the determination unit 220 can also determine the similarity in real time on the basis of sound information related to the external sound collected by the information processing terminal 10.

Further, the determination unit 220 according to the present embodiment determines whether a user has identified a source of an information notification on the basis of the user's facial expression, state, and the like recognized by the recognition unit 210. The output control unit 230 according to the present embodiment may control an output mode on the basis of the above-described determination by the determination unit 220.

(Output Control Unit 230)

The output control unit 230 according to the present embodiment has a function of controlling output of an information notification using sound by the information processing terminal 10. At this time, one of features of the output control unit 230 according to the present embodiment is to cause, on the basis of an external sound source recognized by the recognition unit 210, the information processing terminal 10 to output the information notification in an output mode that is not similar to an external sound that can be emitted by the external sound source.

Note that an output mode according to the present embodiment includes a frequency, prosody, output intensity, and voice quality as described above. That is, the output control unit 230 according to the present embodiment can change acoustic features as described above related to the information notification to prevent it from being similar to the external sound.

For example, in a case where the information processing terminal 10 has a function of outputting a voice notification using voice, the output control unit 230 may cause the information processing terminal 10 to output a voice notification with a voice quality that is not similar to the external sound that can be emitted by the external sound source. At this time, in a case where the external sound source is a male in his 50s, the output control unit 230 may set the voice quality of the information notification to a voice quality of a female in her 20s. According to the above-described function of the output control unit 230, the user can easily distinguish between the information notification and the external sound.

Further, the output control unit 230 according to the present embodiment may change a tone of an information notification to prevent it from being similar to an external sound. For example, in a case where an external sound source is a person who speaks in a friendly tone, the output control unit 230 may output an information notification in a polite language. Further, the output control unit 230 may change an ending or the like of voice of an information notification to differentiate it from an external sound.

Note that the above description mainly focuses on a case where an external sound source is a person, but the external sound source is not limited to such an example. The external sound source according to the present embodiment may be various sound sources that can emit sounds that rival the information notification.

FIGS. 5A to 5D are diagrams for describing variations of an external sound source according to the present embodiment. FIG. 5A illustrates an example in which an external sound source SS is a device that performs an information notification using voice. The external sound source SS illustrated in FIG. 5A may be, for example, a stationary-type voice agent. At this time, the output control unit 230 according to the present embodiment may cause the information processing terminal 10 to output an information notification IN in an output mode that is not similar to an external sound ES. In the example illustrated in FIG. 5A, the output control unit 230 controls a voice quality or tone of the information notification IN to prevent it from being similar to the external sound ES. According to the above-described function of the output control unit 230, a user can clearly grasp a source of information even in a case where a device that performs a voice information notification exists in addition to the information processing terminal 10.

Figure 5B:
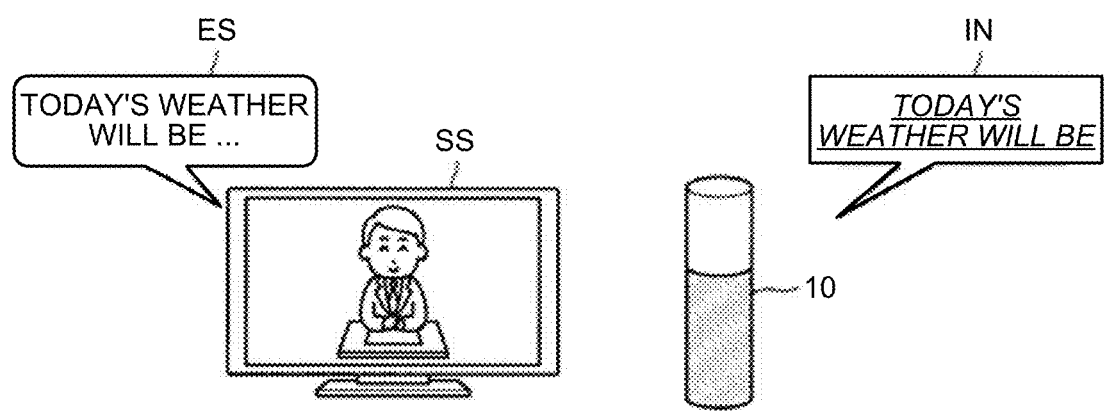
FIG. 5B is a diagram for describing a variation of an external sound source according to the same embodiment.

Further, FIG. 5B illustrates an example in which an external sound source SS is a device having a function of reproducing a video. The external sound source SS illustrated in FIG. 5B may be a television device, for example. At this time, the output control unit 230 according to the present embodiment may cause the information processing terminal 10 to output an information notification IN in an output mode that is not similar to an external sound ES such as an utterance included in a video. In the example illustrated in FIG. 5B, the output control unit 230 controls a voice quality and the like of the information notification IN to prevent it from being similar to the external sound ES. According to the above-described function of the output control unit 230, even in a case where a user is watching a video, the user can easily perceive that a source of the information notification IN is the information processing terminal 10.

Figure 5C:
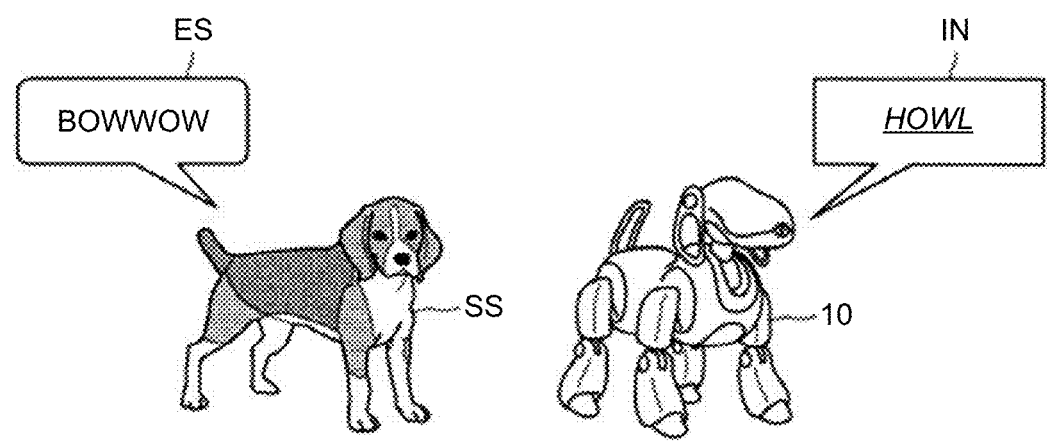
FIG. 5C is a diagram for describing a variation of an external sound source according to the same embodiment.

Further, FIG. 5C illustrates an example in which an external sound source SS is a living matter such as a pet. Note that the information processing terminal 10 in FIG. 5C may be a pet-type agent. At this time, the output control unit 230 according to the present embodiment may cause the information processing terminal 10 to output an information notification IN in an output mode that is not similar to an external sound ES that is a call of the external sound source SS. In the example illustrated in FIG. 5C, the output control unit 230 controls a frequency, prosody, and the like of the information notification IN to prevent it from being similar to the external sound ES. According to the above-described function of the output control unit 230, even in a case where a user lives with a living pet, the user can easily perceive that a source of the information notification IN is the information processing terminal 10 that is a pet-type agent.

Figure 5D:
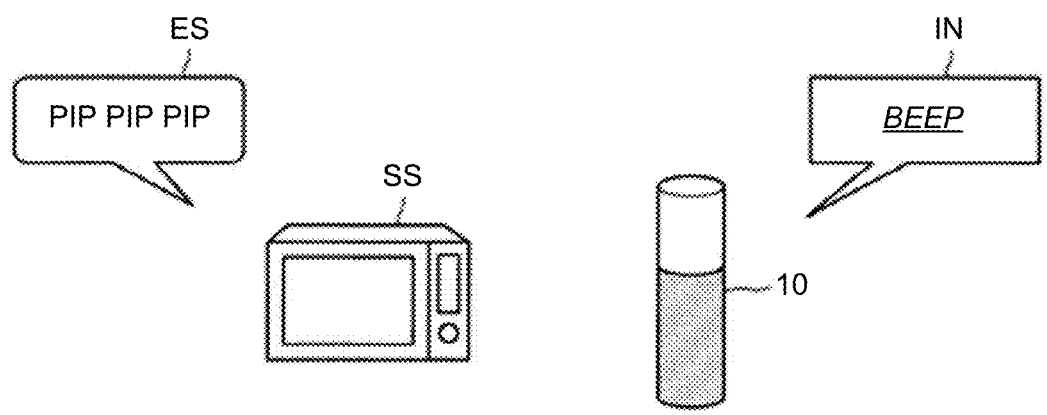
FIG. 5D is a diagram for describing a variation of an external sound source according to the same embodiment.

Further, FIG. 5D illustrates an example in which an external sound source SS is a device that outputs a notification sound. The external sound source SS illustrated in FIG. 5D may be a home appliance such as a microwave oven, for example. At this time, the output control unit 230 according to the present embodiment may cause the information processing terminal 10 to output an information notification IN in an output mode that is not similar to an external sound ES that can be emitted by the external sound source SS. In the example illustrated in FIG. 5D, the output control unit 230 controls a frequency, prosody, and the like of the information notification IN to prevent it from being similar to the external sound ES. According to the above-described function of the output control unit 230, even in a case where various devices that emit notification sounds exist around the information processing terminal 10, a user can easily identify a source of a sound the user has perceived.

(Audio Synthesis Unit 240)

The audio synthesis unit 240 according to the present embodiment has a function of synthesizing artificial voice to be output by the information processing terminal 10 on the basis of control by the output control unit 230.

(Storage Unit 250)

The storage unit 250 according to the present embodiment includes the user DB 252, the external sound source DB 254, and the output mode DB 256.

((User DB 252))

The user DB 252 according to the present embodiment stores various information related to a user. The user DB 252 stores, for example, the user's facial image and voice features. Further, the user DB 252 may store information such as the user's sex, age, taste, and tendency.

((External Sound Source DB 254))

The external sound source DB 254 according to the present embodiment stores structural features of an external sound source and acoustic features of an external sound that can be emitted by the external sound source. The determination unit 220 according to the present embodiment can determine the above-described similarity on the basis of information stored in the external sound source DB 254. Further, ((Output Mode DB 256))

The output mode DB 256 according to the present embodiment stores an output mode preset for an information notification. For example, the output mode DB 256 may store a plurality of output modes each of which is set for a corresponding information notification category.

Further, the output mode DB 256 can also store an appropriate output mode for a predetermined external sound source. The output mode DB 256 may store, for example, an appropriate output mode for an external sound source that is a family member of a user, that is, an output mode that is not similar to voice of the family member. In this case, on the basis of recognition of the external sound source that is the family member of the user, the output control unit 230 can acquire the appropriate output mode from the output mode DB 256 and cause an information notification to be output with a voice quality different from that of the family member.

(Terminal Communication Unit 260)

The terminal communication unit 260 according to the present embodiment has a function of performing information communication with the information processing terminal 10 via the network 30. Specifically, the terminal communication unit 260 receives, from the information processing terminal 10, sound information and image information such as a user's utterance and an external sound. Further, the terminal communication unit 260 transmits, to the information processing terminal 10, a control signal generated by the output control unit 230 and artificial voice synthesized by the audio synthesis unit 240.

The functional configuration example of the information processing server 20 according to the present embodiment has been described above. Note that the functional configuration described above with reference to FIG. 4 is merely an example, and the functional configuration of the information processing server 20 according to the present embodiment is not limited to such an example. For example, the information processing server 20 does not necessarily include all of the components illustrated in FIG. 4. The recognition unit 210, the determination unit 220, the audio synthesis unit 240, and the storage unit 250 can be included in a device different from the information processing server 20. The functional configuration of the information processing server 20 according to the present embodiment can be flexibly modified depending on specifications and operations.

1.5. Details of Output Control

Next, output control of an information notification by the output control unit 230 according to the present embodiment will be described in detail.

(Control Related to Timing of Changing Output Mode)

First, control related to a timing of changing an output mode according to the present embodiment will be described. As described above, the output control unit 230 according to the present embodiment can change an output mode of an information notification by the information processing terminal 10 on the basis of an external sound source recognized by the recognition unit 210. However, in a case where the output mode of the information notification is changed immediately after the external sound source is recognized, it is assumed that a user may feel uncomfortable with the sudden change. For this reason, the output control unit 230 according to the present embodiment can effectively reduce a possibility of causing a user to feel uncomfortable, by controlling a timing of changing an output mode on the basis of various output contexts.

Here, the output contexts described above include, for example, information notification categories. The output control unit 230 according to the present embodiment may change an output mode of an information notification when the information notification switches to another category.

FIG. 6 is a diagram for describing control of a timing of changing an output mode on the basis of an information notification category according to the present embodiment. FIG. 6 illustrates a visual information VI displayed by the display unit 110 of the information processing terminal 10. Further, speaker characters C1 and C2 are displayed in the visual information VI. Here, the speaker characters C1 and C2 are characters associated with different information notification categories.

For example, the speaker character C1 may be a character associated with information notifications related to a weather forecast. At this time, a case is assumed in which an external sound source having acoustic features similar to voice and tone set for the speaker character C1 is recognized in a situation where the speaker character C1 is performing an information notification IN1 related to a weather forecast. At this time, the output control unit 230 according to the present embodiment finishes the information notification IN1 related to the weather forecast as usual without changing the output mode of the information notification IN1 by the speaker character C1.

Next, the output control unit 230 displays the speaker character C2, for which a voice quality or tone different from those of the speaker character C1 are set, at a timing when the output is switched to an information notification IN2 related to sports news that is in a different category, and causes the speaker character C2 to present the information notification IN2 related to sports news.

Thus, the output control unit 230 according to the present embodiment can switch between a plurality of speaker characters associated with output modes at a timing when the information notification switches to another category. According to the above-described function of the output control unit 230 according to the present embodiment, it is possible to reduce effectively a user's uncomfortable feeling toward a change in output mode. Note that the information notification categories described above may be appropriately set on the basis of contents of information notifications, applications that generate the information notifications, or the like.

Figure 7:
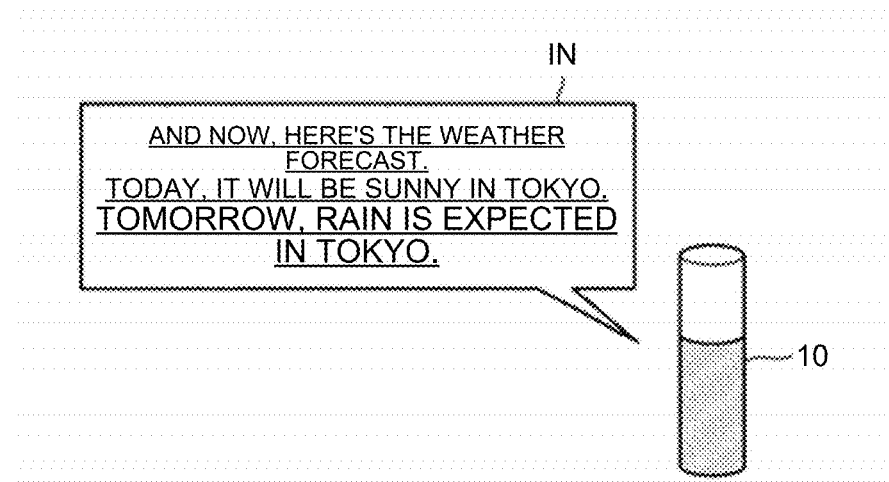
FIG. 7 is a diagram for describing control of a timing of changing an output mode on the basis of the length of an information notification according to the same embodiment.

Further, the output contexts described above include, for example, the length of an information notification. The output control unit 230 according to the present embodiment may change an output mode in a stepwise manner on the basis of the length of an information notification. FIG. 7 is a diagram for describing control of a timing of changing an output mode on the basis of the length of an information notification according to the present embodiment. FIG. 7 illustrates an information notification IN output by the information processing terminal 10.

Here, the information notification IN illustrated in FIG. 7 includes a plurality of sentences and requires a relatively long output time. In a case like this, where the information notification IN has a sufficient length, the output control unit 230 according to the present embodiment may, for example, change an output mode in a stepwise manner for each sentence included in the information notification IN. According to the above-described function of the output control unit 230 according to the present embodiment, it is possible to avoid an abrupt change in output mode and effectively reduce a user's uncomfortable feeling.

Further, the output contexts described above include, for example, the number of times of control related to an output mode of an information notification. Even in a case where control is performed on the basis of the category and length of the information notification as described above, in a case where the output mode changes many times in a short time, it is assumed that a user may feel uncomfortable with the repeated changes in output mode. For this reason, the output control unit 230 according to the present embodiment may control output of an information notification on the basis of the number of times of control related to an output mode. More specifically, the output control unit 230 according to the present embodiment may perform control so that the number of changes in output mode in a predetermined time does not exceed a threshold.

Figure 8:
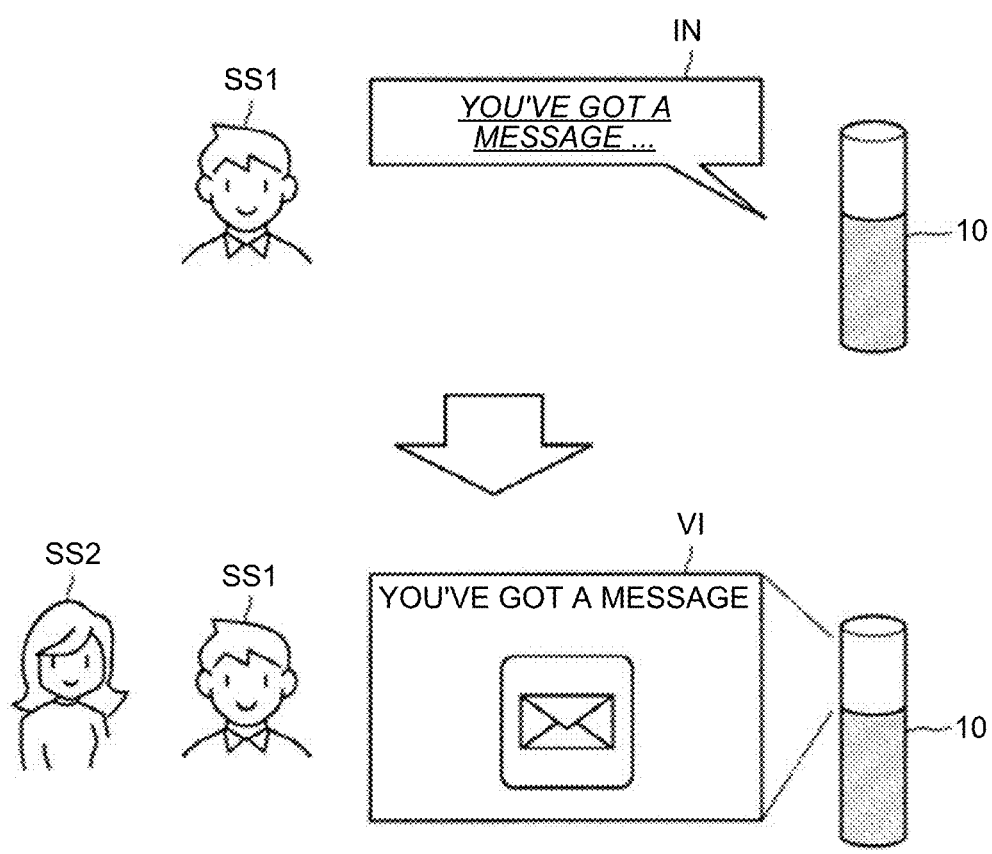
FIG. 8 is a diagram for describing output control based on the number of times of output mode control according to the same embodiment.

FIG. 8 is a diagram for describing output control based on the number of times of output mode control according to the present embodiment. An upper part of FIG. 8 illustrates a recognized external sound source SS1 and an information notification IN in an output mode controlled so as not to be similar to an external sound that can be emitted by the external sound source SS1.

Further, a lower part of FIG. 8 illustrates a situation where an external sound source SS2 is further recognized in the state of the upper part of FIG. 8. At this time, to avoid a plurality of changes in output mode of an information notification in a short time, the output control unit 230 according to the present embodiment may, for example, cause a visual information VI to be output instead of the information notification as illustrated.

According to the above-described function of the output control unit 230 according to the present embodiment, it is possible to prevent an information notification output mode from changing frequently and effectively reduce a user's uncomfortable feeling.

(Control Based on Output Tendency of External Sound)

Next, control based on an output tendency of an external sound according to the present embodiment will be described. For example, in a case where the information processing terminal 10 is installed in a home, it is assumed that various external sound sources exist around, such as another information terminal, home appliances, and a family member of a user. On the other hand, the external sound sources as described above may not always emit external sounds. Further, the output tendencies of the external sounds emitted by the external sound sources as described above may have a regularity. For this reason, the output control unit 230 according to the present embodiment may control an output mode of an information notification on the basis of the output tendencies of the external sounds emitted by the external sound sources existing around the information processing terminal 10.

Figure 9:
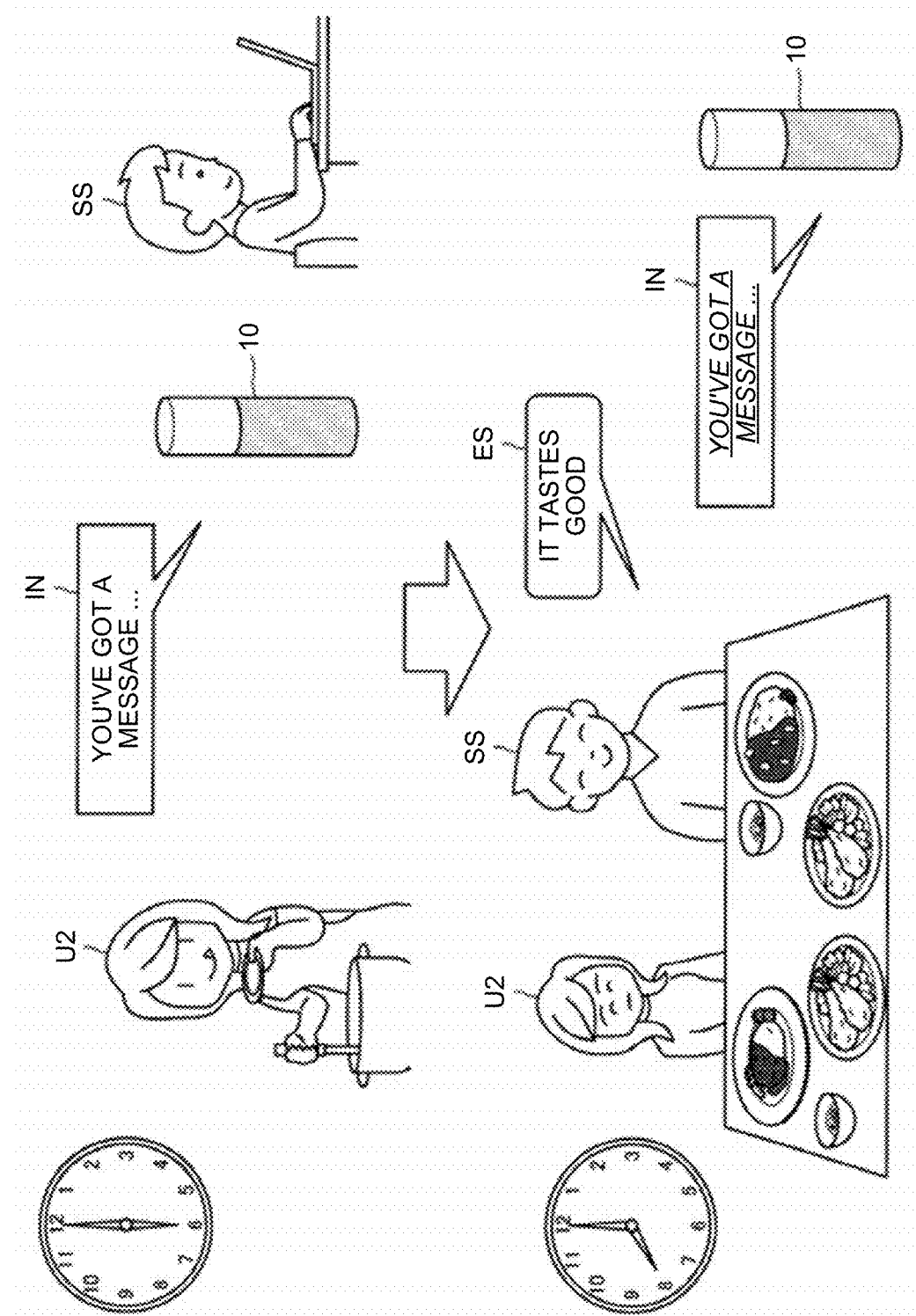
FIG. 9 is a diagram for describing control of an output mode on the basis of an output tendency of an external sound according to the same embodiment.

FIG. 9 is a diagram for describing control of an output mode on the basis of an output tendency of an external sound according to the present embodiment. An upper part of FIG. 9 illustrates a situation in a home at 18:00. In an example illustrated in the upper part of FIG. 9, in a time zone close to 18:00, a user U2 is cooking, and an external sound source SS that is a family member of the user U2 is operating a computer, for example.

Thus, for example, depending on the time zone or the like, there may be a strong tendency that the external sound source SS does not emit an external sound. For this reason, the output control unit 230 according to the present embodiment may cause the information processing terminal 10 to output an information notification IN in a preset output mode in a time zone in which the external sound source SS is not likely to emit an external sound.

On the other hand, a lower part of FIG. 9 illustrates a situation in the home at 20:00. In an example illustrated in the lower part of FIG. 9, in a time zone close to 20:00, the user U2 and the external sound source SS are both in the middle of a meal. Further, at this time, the external sound source SS emits an external sound ES that is a part of a conversation with the user U2.

Thus, the external sound source SS may have a strong tendency to emit an external sound depending on the time zone. For this reason, in a time zone in which the external sound source SS has a strong tendency to emit the external sound ES, the output control unit 230 according to the present embodiment may change the output mode of the information notification IN to prevent it from being similar to the external sound ES.

According to the above-described function of the output control unit 230 according to the present embodiment, it is possible to control an output mode of an information notification only in a situation where the external sound ES is likely to be generated, and the number of changes in output mode can be reduced. This enables a reduction in user's uncomfortable feeling and an effective reduction in processing cost.

Note that the above description with reference to FIG. 9 describes, as an example, a case where the output control unit 230 controls the output mode of the information notification on the basis of the utterance tendency of the user who is an external sound source, but the control according to the present embodiment is not limited to such an example. For example, also in a case where an external sound source is a home appliance, it is assumed that output of a notification sound tends to depend on the time zone or the like. In this case, the output control unit 230 according to the present embodiment can change the output mode of the notification sound depending on the time zone.

(Control of External Sound Source)

Next, control of an external sound source according to the present embodiment will be described. In the above description, a case has been described where the output control unit 230 controls an output mode of an information notification by the information processing terminal 10 to prevent the information notification from being similar to an external sound. On the other hand, in a case where the external sound source is an acoustic output device having a function of outputting sound, the output control unit 230 according to the present embodiment can also control output of an external sound emitted by the external sound source.

FIG. 10 is a diagram for describing control of an external sound source according to the present embodiment. An upper part of FIG. 10 illustrates an external sound source SS that is a television device and the information processing terminal 10. Further, an example illustrated in the upper part of FIG. 10 illustrates a case of high similarity between an external sound ES emitted by the external sound source SS and an information notification output by the information processing terminal 10.

At this time, the output control unit 230 according to the present embodiment may control an output mode of the external sound ES output by the external sound source SS as illustrated in a lower part of FIG. 10. In a case of an example illustrated in the lower part of FIG. 10, the output control unit 230 changes a voice quality or the like of the external sound ES to prevent it from being similar to an information notification IN. The output control unit 230 can perform the above-described control by using, for example, an optional frequency filter. Further, the output control unit 230 may mute output of the original external sound ES from the external sound source SS and cause the external sound source SS to output artificial voice synthesized by the audio synthesis unit 240.

According to the above-described function of the output control unit 230 according to the present embodiment, for example, when the information processing terminal 10 is performing an important information notification, an output mode of the information notification can be maintained. This can reduce a user's uncomfortable feeling more effectively.

1.6. Flow of Processing

Figure 11:
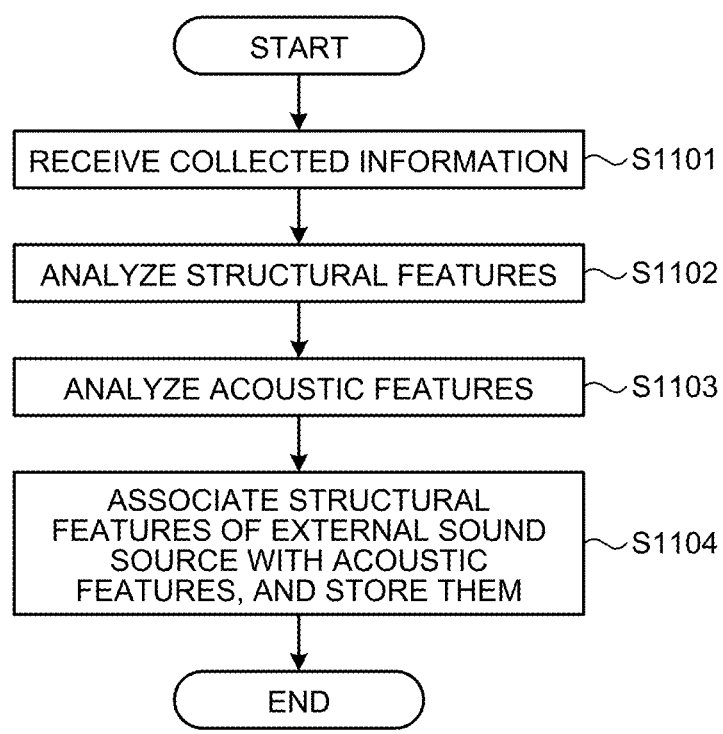
FIG. 11 is a flowchart illustrating a flow of accumulation of external sound source data by the information processing server according to the same embodiment.

Next, a flow of processing performed by the information processing server 20 according to the present embodiment will be described in detail. First, accumulation of external sound source data by the information processing server 20 according to the present embodiment will be described. FIG. 11 is a flowchart illustrating the flow of accumulation of external sound source data by the information processing server 20 according to the present embodiment.

Referring to FIG. 11, first, the terminal communication unit 260 of the information processing server 20 receives collected information from the information processing terminal 10 (S1101). Here, the collected information described above includes sound information related to an external sound emitted by an external sound source and image information including the external sound source.

Next, the recognition unit 210 analyzes structural features of the external sound source on the basis of the image information related to the external sound source received in Step S1101 (S1102).

Subsequently, the recognition unit 210 analyzes acoustic features of the external sound on the basis of the sound information related to the external sound received in Step S1101 (S1103).

Subsequently, the recognition unit 210 associates the structural features of the external sound source analyzed in Step S1102 with the acoustic features of the external sound analyzed in Step S1103, and stores them in the external sound source DB 254.

Figure 12:
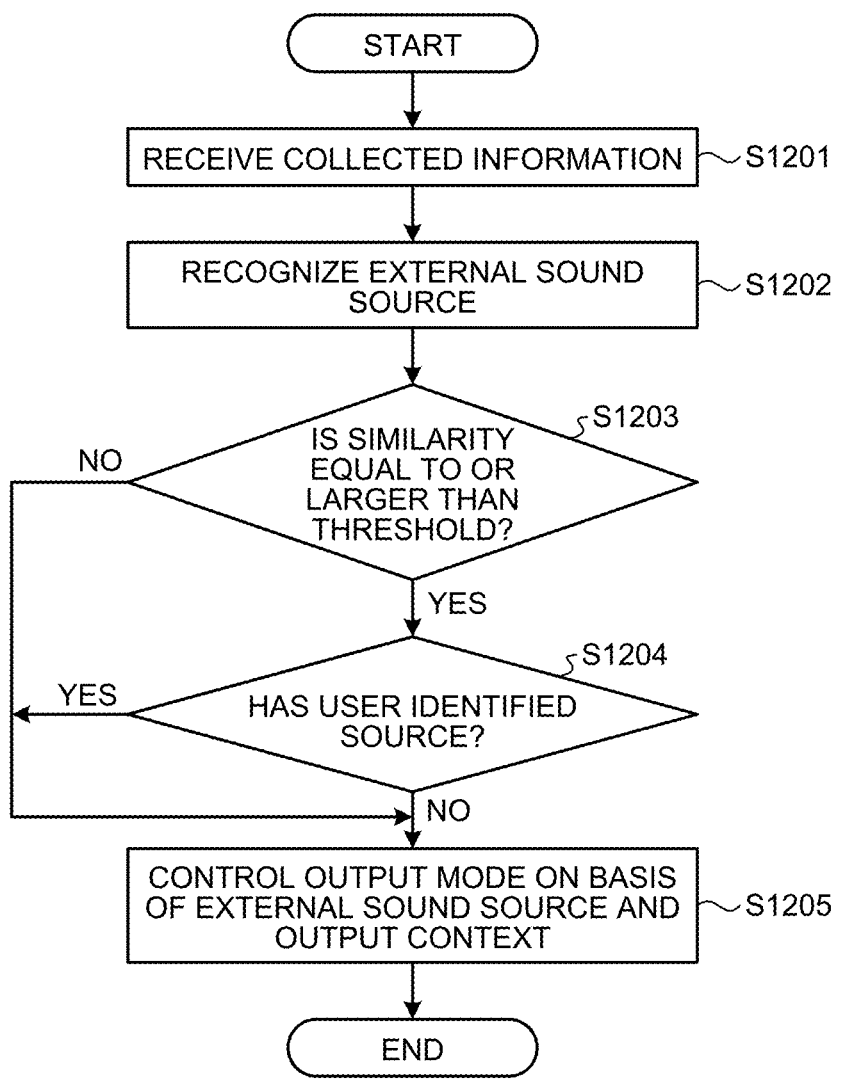
FIG. 12 is a flowchart illustrating a flow of output mode control by the information processing server according to the same embodiment.

Next, a flow of output mode control by the information processing server 20 according to the present embodiment will be described. FIG. 12 is a flowchart illustrating the flow of output mode control by the information processing server 20 according to the present embodiment.

Referring to FIG. 12, first, the terminal communication unit 260 of the information processing server 20 receives collected information from the information processing terminal 10 (S1201).

Next, the recognition unit 210 recognizes an external sound source on the basis of the collected information received in Step S1201 (S1202). Note that in a case where corresponding external sound source data does not exist in the external sound source DB 254 in Step S1202, the recognition unit 210 may add data to the external sound source DB 254 as a new external sound source.

Next, the determination unit 220 determines whether similarity between an external sound of the external sound source recognized in Step S1202 and an output mode preset for an information notification is equal to or larger than a threshold (S1203).

Here, in a case where the similarity is less than the threshold (S1203: No), the information processing server 20 ends processing related to control of the output mode, and outputs the information notification in the preset output mode.

On the other hand, in a case where the similarity is equal to or larger than the threshold (S1203: Yes), the determination unit 220 subsequently determines whether a user has identified a source of the information notification (S1204).

Here, in a case where the determination unit 220 determines that the user has identified the source of the information notification (S1204: Yes), the information processing server 20 ends the processing related to control of the output mode, and outputs the information notification in the preset output mode.

On the other hand, in a case where the determination unit 220 determines that the user has not identified the source of the information notification (S1204: No), the output control unit 230 controls the output mode of the information notification to prevent it from being similar to the external sound (S1205). At this time, the output control unit 230 can control a timing of changing the output mode on the basis of various output contexts.

2. Hardware Configuration Example

Figure 13:
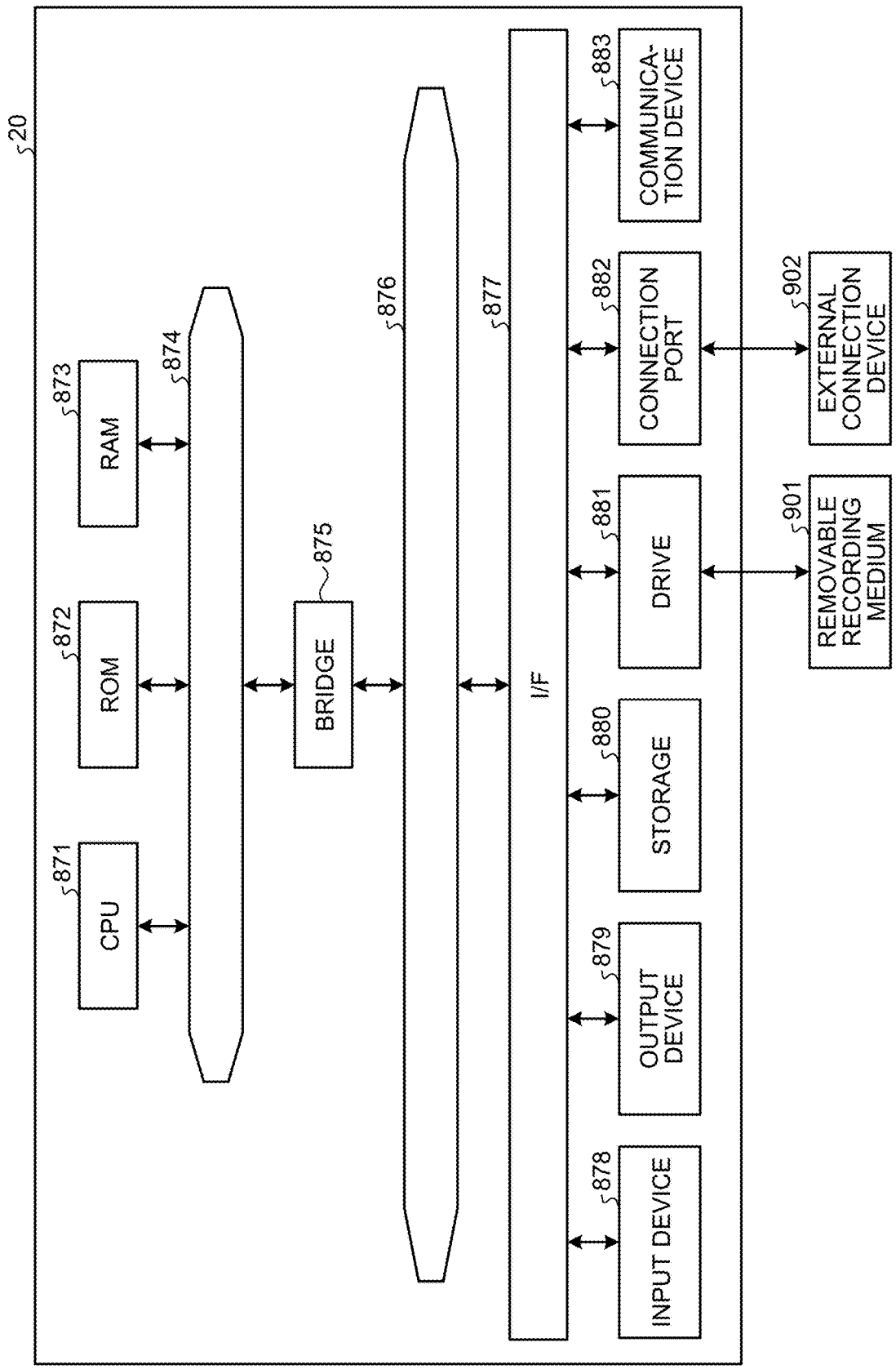
FIG. 13 is a diagram illustrating a hardware configuration example common to an information processing terminal and an information processing server according to one embodiment of the present disclosure.

Next, a hardware configuration example common to an information processing terminal 10 and an information processing server 20 according to one embodiment of the present disclosure will be described. FIG. 13 is a block diagram illustrating the hardware configuration example of the information processing terminal 10 and the information processing server 20 according to the embodiment of the present disclosure. Referring to FIG. 13, the information processing terminal 10 and the information processing server 20 include, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. Further, components other than the components illustrated here may be further included.

(CPU 871)

The CPU 871 functions as, for example, an arithmetic processor or a controller, and controls the whole of or a part of operation of each component on the basis of various programs recorded on the ROM 872, the RAM 873, the storage 880, or a removable recording medium 901.

(ROM 872 and RAM 873)

The ROM 872 is means for storing a program read into the CPU 871, data used for calculation, and the like. The RAM 873 temporarily or permanently stores, for example, a program read into the CPU 871 and various parameters that change as appropriate when the program is executed.

(Host Bus 874, Bridge 875, External Bus 876, and Interface 877)

The CPU 871, the ROM 872, and the RAM 873 are connected to each other via, for example, the host bus 874 capable of high-speed data transmission. On the other hand, the host bus 874 is connected to the external bus 876, which has a relatively low data transmission speed, via the bridge 875, for example. Further, the external bus 876 is connected to various components via the interface 877.

(Input Device 878)

As the input device 878, for example, a mouse, a keyboard, a touch panel, a button, a switch, and a lever are used. Furthermore, as the input device 878, a remote controller (hereinafter referred to as the remote controller) that can transmit a control signal using infrared rays or other radio waves may be used. Further, the input device 878 includes a voice input device such as a microphone.

(Output Device 879)

The output device 879 is a device that can visually or audibly notify a user of acquired information, for example, a display device such as a cathode ray tube (CRT), an LCD, or an organic EL, an audio output device such as a speaker or a headphone, a printer, a mobile phone, or a facsimile. Further, the output device 879 according to the present disclosure includes various vibration devices that can output haptic stimulation.

(Storage 880)

The storage 880 is a device for storing various data. As the storage 880, for example, a magnetic storage device such as a hard disk drive (HDD), a semiconductor storage device, an optical storage device, or a magneto-optical storage device is used.

(Drive 881)

The drive 881 is, for example, a device that reads information recorded on the removable recording medium 901 such as a magnetic disk, an optical disk, a magneto-optical disk, or a semiconductor memory, or writes information on the removable recording medium 901.

(Removable Recording Medium 901)

The removable recording medium 901 is, for example, a DVD medium, a Blu-ray (registered trademark) medium, an HD DVD medium, or various semiconductor storage media. Needless to say, the removable recording medium 901 may be, for example, an IC card equipped with a non-contact IC chip or an electronic device.

(Connection Port 882)

The connection port 882 is, for example, a port for connecting to an external connection device 902, such as a universal serial bus (USB) port, an IEEE 1394 port, a small computer system interface (SCSI), an RS-232C port, or an optical audio terminal.

(External Connection Device 902)

The external connection device 902 is, for example, a printer, a portable music player, a digital camera, a digital video camera, or an IC recorder.

(Communication Device 883)

The communication device 883 is a communication device for connecting to a network, for example, a communication card for wired or wireless LAN, Bluetooth (registered trademark), or Wireless USB (WUSB), a router for optical communication, a router for an asymmetric digital subscriber line (ADSL), or a modem for various communications.

3. Summary

As described above, the information processing server 20 according to one of the embodiments of the present disclosure has a function of causing, on the basis of various recognized external sound sources, an information notification to be output in an output mode that is not similar to external sounds that can be emitted by the external sound sources. Such a configuration allows a user to grasp clearly a source of information with sound.

While the preferred embodiments of the present disclosure have been described above in detail with reference to the accompanying drawings, the technical scope of the present disclosure is not limited to such examples. It is apparent to those skilled in the art of the present disclosure that various modifications and alterations can be conceived within the scope of the technical idea described in the claims. It is naturally understood that such modifications and alterations also belong to the technical scope of the present disclosure.

Further, the effects described in the present specification are merely illustrative or exemplary and are not restrictive. That is, the technology according to the present disclosure can produce other effects that are apparent to those skilled in the art from the description of the present specification, together with or instead of the effects described above.

Further, the steps of the processing performed by the information processing server 20 in the present specification do not necessarily have to be processed in chronological order in the order described in the flowcharts. For example, the steps of the processing performed by the information processing server 20 may be performed in an order different from the order described in the flowcharts, or may be processed in parallel.

Note that configurations as described below also belong to the technical scope of the present disclosure.

(1)

An information processor comprising an output control unit that controls output of an information notification using sound, the output control unit causing, on the basis of a recognized external sound source, the information notification to be output in an output mode that is not similar to an external sound that can be emitted by the external sound source.

(2)

The information processor according to (1), wherein the output mode of the information notification includes at least one of a frequency, prosody, or output intensity.

(3)

The information processor according to (1) or (2), wherein the information notification includes a voice notification, and the output control unit causes the voice notification to be output in an output mode that is not similar to the external sound that can be emitted by the external sound source.

(4)

The information processor according to (3), wherein the output control unit causes the voice notification to be output with a voice quality or tone that is not similar to the external sound that can be emitted by the external sound source.

(5)

The information processor according to (3) or (4), wherein the external sound source includes a person or an audio output device.

(6)

The information processor according to any one of (3) to (5), wherein the output control unit controls a timing of changing the output mode of the voice notification on the basis of an output context related to the voice notification.

(7)

The information processor according to (6), wherein the output context includes a category of the voice notification, and the output control unit changes the output mode of the voice notification when the voice notification switches to another category.

(8)

The information processor according to (7), wherein the output control unit changes the output mode of the voice notification by switching between a plurality of speaker characters associated with output modes of the voice notification.

(9)

The information processor according to (7) or (8), wherein the output context includes a length of the voice notification, and the output control unit changes the output mode of the voice notification in a stepwise manner on the basis of the length of the voice notification.

(10)

The information processor according to any one of (7) to (9), wherein the output context includes the number of times of control related to the output mode of the voice notification, and the output control unit controls the output mode of the voice notification on the basis of the number of times of control.

(11)

The information processor according to any one of (1) to (10), wherein the output control unit controls the output mode of the information notification on the basis of similarity between the external sound that can be emitted by the external sound source and an output mode preset for the information notification.

(12)

The information processor according to (11), wherein the output control unit causes, in a case where the similarity is equal to or larger than a threshold, the information notification to be output in an output mode that is not similar to the external sound that can be emitted by the external sound source.

(13)

The information processor according to any one of (1) to (12), wherein the output control unit controls the output mode of the information notification on the basis of a user's state related to identification of a source.

(14)

The information processor according to any one of (1) to (13), wherein the external sound source is an acoustic output device, and the output control unit controls output of the external sound by the acoustic output device.

(15)

The information processor according to any one of (1) to (14), wherein the output control unit controls the output mode of the information notification on the basis of an output tendency of the external sound emitted by the external sound source.

(16)

The information processor according to any one of (1) to (15), further comprising a recognition unit that recognizes the external sound source.

(17)

The information processor according to (11) or (12), further comprising a determination unit that determines the similarity.

(18)

The information processor according to any one of (1) to (17), further comprising an acoustic output unit that outputs the information notification on the basis of control by the output control unit.

(19)

An information processing method comprising controlling, by a processor, output of an information notification using sound, the controlling further including causing, on the basis of a recognized external sound source, the information notification to be output in an output mode that is not similar to an external sound that can be emitted by the external sound source.

(20)

A program that causes a computer to function as an information processor comprising an output control unit that controls output of an information notification using sound, the output control unit causing, on the basis of a recognized external sound source, the information notification to be output in an output mode that is not similar to an external sound that can be emitted by the external sound source.

REFERENCE SIGNS LIST

10 Information processing terminal
110 Display unit
120 Audio output unit
130 Audio input unit
140 Imaging unit
150 Control unit
160 Server communication unit
20 Information processing server
210 Recognition unit
220 Determination unit
230 Output control unit
240 Audio synthesis unit
250 Storage unit
252 User DB
254 External sound source DB
256 Output mode DB
260 Terminal communication unit

The invention claimed is:

1. An information processor, comprising:

processing circuitry configured to collect information regarding an eternal sound emitted from an external sound source;

control a sound output of an information notification;

determine a similarity between the external sound and the information notification;

in a case that the similarity is greater than a threshold, determine, based on a user state of a user, whether the user identifies a source of the information notification; and in a case that the processing circuitry determines that the user does not identity the source of the information notification, adjust the sound output of the information notification to be output in an output mode that is different from the external sound and distinguishable to the user from the external sound.

2. The information processor according to claim 1, wherein the output mode of the information notification includes at least one of a frequency, prosody, or output intensity.

3. The information processor according to claim 1, wherein the information notification includes a voice notification, and the processing circuitry controls the voice notification to be output in an output mode that is different from the external sound.

4. The information processor according to claim 3, wherein the processing circuitry controls the voice notification to be output with a voice quality or tone that is different from the external sound.

5. The information processor according to claim 3, wherein the external sound source includes a person or an audio output device.

6. The information processor according to claim 3, wherein the processing circuitry controls adjustment of a timing of changing the output mode of the voice notification on the basis of an output context related to the voice notification.

7. The information processor according to claim 6, wherein
the output context includes a category of the voice notification, and
the processing circuit adjusts the output mode of the voice notification when the voice notification switches to another category.

8. The information processor according to claim 7, wherein the processing circuitry adjusts the output mode of the voice notification by switching between a plurality of speaker characters associated with output modes of the voice notification.

9. The information processor according to claim 7, wherein
the output context includes a length of the voice notification, and
the processing circuitry adjusts, the output mode of the voice notification in a stepwise manner on the basis of the length of the voice notification.

10. The information processor according to claim 7, wherein
the output context includes the number of times of control related to the output mode of the voice notification, and
the processing circuitry adjusts the output mode of the voice notification on the basis of the number of times of control.

11. The information processor according to claim 1, wherein the processing circuitry adjusts the output mode of the information notification on the basis of similarity between the external sound and an output mode preset for the information notification.

12. The information processor according to claim 1, wherein the processing circuitry adjusts the output mode of the information notification on the basis of a user's state related to identification of a source.

13. The information processor according to claim 1, wherein
the external sound source is an acoustic output device, and
the processing circuitry controls output of the external sound by the acoustic output device.

14. The information processor according to claim 1, wherein the processing circuitry adjusts the output mode of the information notification on the basis of an output tendency of the external sound emitted by the external sound source.

15. The information processor according to claim 1, wherein the processing circuitry is further configured to recognize the external sound source.

16. The information processor according to claim 1, further comprising a speaker that outputs the information notification on the basis of control by the processing circuitry.

17. An information processing method, comprising:
collecting information regarding an external sound emitted from an external sound source;
controlling, by processing circuitry, a sound output of an information notification;
determining a similarity between the external sound and the information notification;
in a case that the similarity is greater than a threshold, determining, by the processing circuitry based on a user state of a user whether the user identifies a source of the information notification; and
in a case that the determining indicates that the user does not identify the source of the information notification, adjusting the sound output of the information notification to be output in an output mode that is different from the external sound and distinguishable to the user from the external sound.

18. The information processing method according to claim 17, further comprising recognizing the external sound source.

19. A non-transitory computer readable medium storing computer executable instructions which, when executed by processing circuitry, cause the processing circuitry to:
collect information regarding an external sound emitted from an external sound source;
control a sound output of an information notification;
determine a similarity between the external sound and the information notification;
in a case that the similarity is greater than a threshold, determine, based on a user state of a user, whether the user identities a source of the information notification; and
in a case that the processing circuitry determines that the user does not identify the source of the information notification, adjust the sound output of the information notification to be output in an output mode that is different from the external sound and distinguishable to the user from the external sound.

20. The non-transitory computer readable medium according to claim 19, wherein the processing circuitry is further caused to recognize the external sound source.

* * * * *